(12) United States Patent
Corcoran, III

(10) Patent No.: US 6,606,563 B2
(45) Date of Patent: Aug. 12, 2003

(54) INCURSION ALERTING SYSTEM

(75) Inventor: James J. Corcoran, III, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/800,175

(22) Filed: Mar. 6, 2001

(65) Prior Publication Data

US 2003/0033084 A1 Feb. 13, 2003

(51) Int. Cl.[7] ............................................. G06F 163/00
(52) U.S. Cl. ........................ 701/301; 701/301; 701/3; 701/4; 701/207; 701/120; 701/13; 701/14; 340/479; 340/435; 342/933; 342/961; 342/456
(58) Field of Search ................................ 701/301, 3, 4, 701/206, 207, 120, 13, 14; 340/961, 933, 963, 979, 972, 435; 342/29, 36, 59, 455, 456, 37; 343/5

(56) References Cited

U.S. PATENT DOCUMENTS

| 5,519,392 | A | | 5/1996 | Oder et al. | |
|---|---|---|---|---|---|
| 5,530,440 | A | * | 6/1996 | Danzer et al. | 340/933 |
| 5,629,691 | A | * | 5/1997 | Jain | 340/961 |
| 5,740,047 | A | * | 4/1998 | Pilley et al. | 340/961 |
| 6,076,042 | A | * | 6/2000 | Tognazzini | 701/301 |
| 6,199,008 | B1 | | 3/2001 | Aratow et al. | |
| 6,219,618 | B1 | * | 4/2001 | Bateman | 701/301 |
| 2001/0013836 | A1 | * | 8/2001 | Cowie | 340/961 |

FOREIGN PATENT DOCUMENTS

| DE | 4304562 A | | 8/1994 |
|---|---|---|---|
| EP | 00565399 A | | 10/1993 |
| EP | 0744630 A | | 11/1996 |
| EP | 0744630 | * | 11/1996 |
| EP | 0756153 A | | 1/1997 |
| WO | WO 9747946 A | | 12/1997 |
| WO | WO 9909429 A | | 2/1999 |
| WO | WO 00/16230 | | 3/2000 |
| WO | WO 0057202 A | | 9/2000 |

* cited by examiner

*Primary Examiner*—Thomas G. Black
*Assistant Examiner*—Tuan C To

(57) ABSTRACT

A system for alerting the occupant of a vehicle that the vehicle is in or approaching a zone of awareness. For instance, the system may be used to alert the pilot or flight crew of an aircraft that the aircraft is on or approaching a runway, and may identify the specific runway. Thus, the invention also provides a method of reducing unintentional incursions of taxiing aircraft onto runways. The system generally includes a storage device or memory, a positioning system such as a GPS that typically repeatedly determines the location of the vehicle, an alerting device such as an alarm or display, and a processor, all of which are typically located on the vehicle. The processor typically compares the location of the vehicle with stored location information for various zones of awareness and initiates an alert when appropriate. The processor may take into consideration the velocity and direction of travel of the vehicle. Zones of awareness may be defined by coordinates, such as the end points of line segments. Audible alarms may include a voice warning, and may be able to be silenced until the vehicle leaves the zone of awareness. On aircraft, the system may reference the centerline of the runway, for example, alerting when the aircraft is within 150 feet of the centerline. The system may be disabled when the aircraft is in flight.

44 Claims, 3 Drawing Sheets

INCURSION ALERTING SYSTEM

BACKGROUND OF THE INVENTION

1. Field of the Invention

This invention relates generally to systems for alerting an occupant of a vehicle that the vehicle is in or approaching a particular area.

2. Description of the Related Art

Collisions between vehicles and other objects or other vehicles is a significant problem. Such collisions can frequently be traced to the vehicle inadvertently being driven or piloted into an area that the vehicle is not supposed to be in, at least at that time. The prior art has typically been to mark such areas and rely on the vigilance of the pilot or operator of the vehicle to observe the signage and to not drive the vehicle into the area. This system works most of the time; however, human operators are prone to human error, and the consequences of such collisions, particularly in certain applications, are so catastrophic that additional measures of preventing such accidents are warranted.

As an example, collisions between aircraft on the ground and other vehicles or aircraft are one significant source of accidents in the aircraft transportation system. One potential cause of a particularly catastrophic collision is an aircraft that is on the ground inadvertently taxiing onto a runway where another aircraft is landing or taking off. Another cause of collisions is an aircraft using the wrong runway. Various systems have been adopted in airports, in part to prevent or minimize such runway incursions. Traditional systems for this purpose include requiring permission from an air traffic controller before an aircraft taxis across a runway, watching and monitoring of the movement of aircraft by air traffic controllers, various signage and markings showing aircraft on the ground where to go, and use of aircraft lights while taxiing so that the aircraft can be seen better by air traffic controllers and pilots of other aircraft. However, the adoption of such systems have not eliminated the problem, and runway incursions have increased in recent years. In responses to these increases, efforts have been undertaken to increase awareness and improve training of pilots, air traffic controllers, and others in a position to cause or prevent runway incursions. However, traditional technology is not a complete solution as it looses its effectiveness in poor visibility or poor weather conditions, and relies on the repeated and consistent avoidance of human error.

As a result, systems have been proposed, including the Airport Movement Area Safety System (AMASS) to monitor runways and alert air traffic controllers when an aircraft or other large object moves onto a runway. Such systems typically use Airport Surface Detection Equipment (ASDE) radar or other detection equipment to monitor the airport surface areas. Generally, when the system detects a runway incursion, the air traffic controller is alerted, who then must determine which aircraft or other object triggered the alarm, and notify the pilot of that aircraft (if the infringer is an aircraft) that they have traveled into an area where they should not be. Such systems are expensive, complicated, cumbersome, and difficult to use. Many detection systems are typically required for the perimeters of many runway safety areas, and air traffic controllers must either disable the system when an aircraft has clearance to cross a controlled parameter, or must deal with a false alarm each time such a crossing occurs. In addition, when an unauthorized incursion does occur, precious time is lost while the air traffic controller tries to figure out which aircraft (if it was an aircraft) triggered the detection equipment and notifies the pilot of the infraction. Furthermore, the use of different systems at different airports make the pilot's jobs more difficult and increase the likelihood of pilot error.

SUMMARY OF THE INVENTION

It is a feature of the present invention to provide a system to alert the operator or occupant of a vehicle that the vehicle is approaching or within a zone of awareness. In an exemplary embodiment, the present invention alerts the pilot or flight crew of an aircraft that is taxiing on the ground that the aircraft is approaching or on a runway, and in some embodiments, which particular runway. Accordingly, it is a feature of this invention to provide a method of reducing unintentional incursions of taxiing aircraft onto runways. Advantages of the present invention include that it is not necessary for all vehicles or aircraft to be equipped with the invention in order for it to work for the vehicles on which it is installed. Similarly, it is not necessary for all geographic areas to adopt the present invention in order for it to work. Therefore, it is not necessary for all vehicles or areas (such as airports) to convert to the system at the same time. Another advantage is that on many vehicles, some or all of the hardware required is already on the vehicles. Therefore, little or no additional hardware is required. Still another advantage is that the present invention is generally not reliant on external systems other than a positioning system such as a GPS. Even another feature of the present invention is that it is typically less expensive than other systems addressing the same problem, avoiding expensive surface equipment with associated maintenance and labor-intensive support.

In furtherance of these features, this invention provides an alerting system for alerting an occupant of a vehicle that the vehicle is approaching a zone of awareness. It may be, as an example, an alerting system for alerting the pilot or flight crew of an aircraft that the aircraft is approaching a zone of awareness surrounding a runway. The alerting system typically includes a database in a storage device located on the vehicle that is configured to store the location of the reference, a positioning system located on the vehicle that is configured to determine the vehicle location, a processor located on the vehicle that is configured to calculate the distance between the vehicle location and the location of the reference, and an alarm located on the vehicle that is configured to alert the occupant when the distance is less than a predetermined value. In other words, the processor is typically configured to calculate the distance between the zone of awareness and the aircraft and initiate the alerting device if the distance is within predetermined parameters.

The reference may be a line or line segment which may have two endpoints and may be defined by the coordinates of each end point. The coordinates may be longitude and latitude, and in some embodiments, the reference is the centerline of a runway and the vehicle is an aircraft. The positioning system may be a global positioning system (GPS), which may have an augmentation system. In some embodiments, there is also an enablement system configured to enable the alerting system when the aircraft is on the ground. The alarm may have an audible indication located on the vehicle, and may also have a silencing feature or system configured to allow the occupant to acknowledge and quiet or silence the audible indication. It may also have a reset feature configured to enable the audible indication after the aircraft exits the zone of awareness. The processor may be configured to rearm the audible indication after the vehicle has left the zone of awareness. The alarm may have a visual indication, which may have a designation of a feature within the zone of awareness such as a runway. The processor may be configured to take into consideration the velocity and direction of travel of the vehicle. It may do this by adjusting the predetermined value, the vehicle location, the location of the reference, or the distance between the vehicle location and the location of the reference. The system may store location coordinate information for substantially all runways at least 3000 feet long that the aircraft is authorized to use.

This invention further provides an alerting system for alerting the pilot or flight crew of an aircraft that the aircraft is within a zone of awareness. The system may have a database on the aircraft containing location coordinate information for a plurality of zones of awareness, a positioning system configured to determine the location coordinates of the aircraft, a display device on the aircraft configured to display the indication to the pilot or flight crew, and a processor on the aircraft configured to: determine whether the aircraft is within a zone of awareness and initiate an indication identifying a zone of awareness the aircraft is within. The location coordinate information for each zone of awareness may be essentially a line. The positioning system may be a GPS, which may have an augmentation system. The predetermined value may be between 100 and 200 feet, and may be approximately 150 feet. The plurality of runways may include substantially all runways at least 3000 feet long that the aircraft is authorized to land at. The indication may be a runway designation. There may be an audible alarm, which may include a voice warning.

This invention even further provides a method of reducing unintentional incursions of taxiing aircraft onto runways. The aircraft typically have a control system and a pilot or flight crew, and the method typically has the steps of storing within the control system the position of a plurality of runways, repeatedly determining the position of the aircraft, calculating the distance between the aircraft and at least one runway, and alerting the pilot or flight crew if the distance is within predetermined parameters. The method may also include the steps of repeatedly determining the velocity of the aircraft, repeatedly determining the heading of the aircraft, and adjusting the predetermined parameters or the position of the aircraft based on the velocity and heading of the aircraft. It may have the step of determining whether the aircraft is on the ground. The alerting may have an audible alarm, and the method may also have the step of the pilot or flight crew manually acknowledging and quieting the alarm. The method may also have the step of re-enabling a quieted alarm when or after the distance between the aircraft and the runway exceeds a predetermined value. The method may also have the step of providing to the pilot or flight crew the designation of the runway that the aircraft is on or near. After the alerting, the pilot or flight crew may contact an air traffic controller for instructions.

The various embodiments of the present invention may include the vehicle that the system is mounted on. The vehicle may be, in some embodiments, an aircraft.

BRIEF DESCRIPTION OF THE DRAWINGS

The present invention is illustrated by way of example and not limitation in the accompanying figures, in which like reference numerals indicate similar elements and in which.

DETAILED DESCRIPTION OF THE EXEMPLARY EMBODIMENTS

Figure 1:
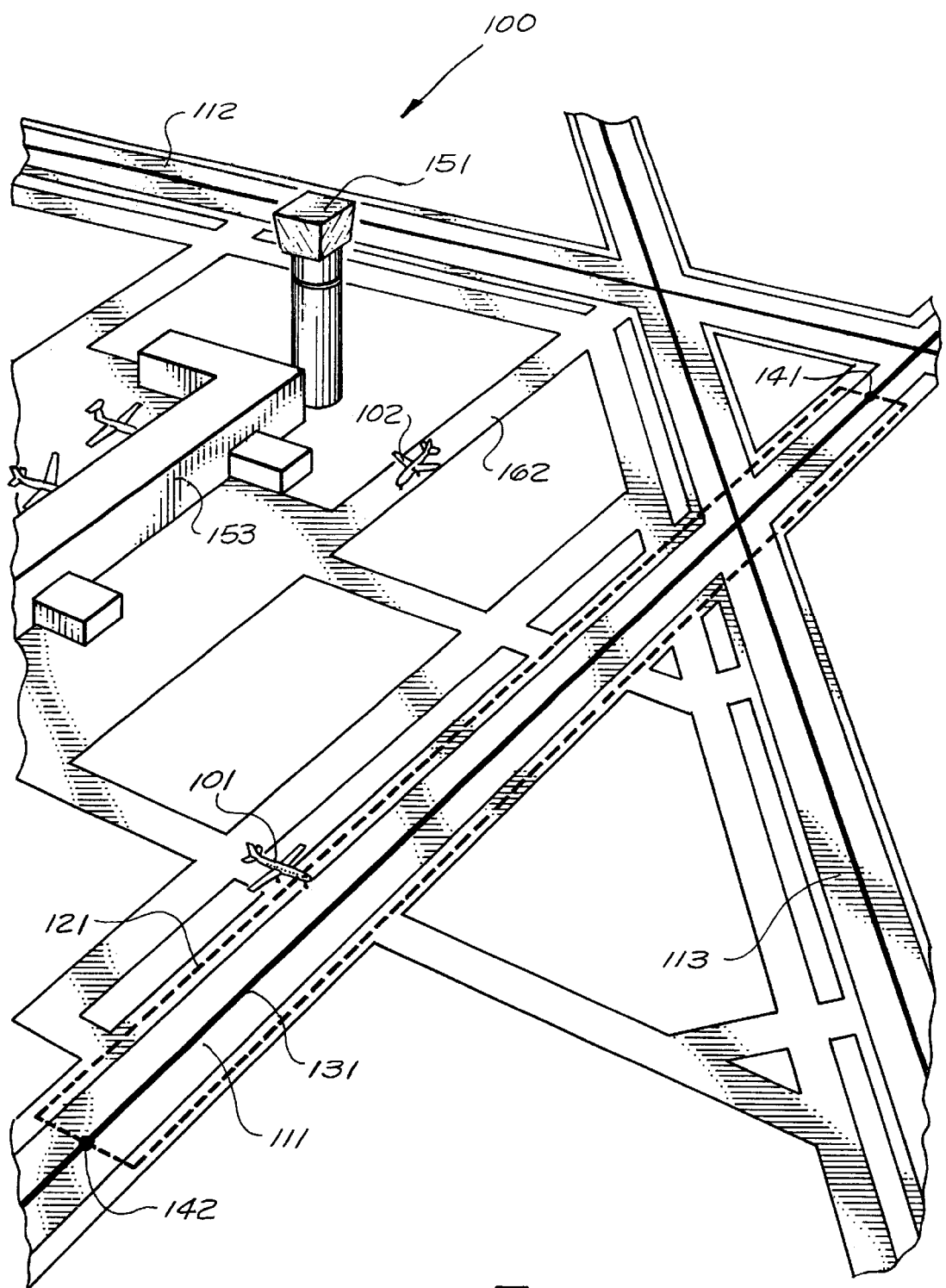
FIG. 1 is an isometric view of an airport with a zone of awareness depicted surrounding a runway, illustrating an exemplary embodiment of the present invention.

The present invention provides a system and method for alerting the occupant of a vehicle that the vehicle is in or approaching a zone of awareness. For instance, as illustrated in FIG. 1, the system may be used to alert the pilot or flight crew of aircraft 101 that aircraft 101 is on or approaching runway 111, and may identify the specific runway 111. Thus, an exemplary embodiment of which is illustrated in FIG. 3, the invention also provides a method of reducing unintentional incursions of aircraft (e.g. taxiing aircraft such as aircraft 101 and 102 shown in FIG. 1) onto runways. As conceptually illustrated in FIG. 2, the system generally includes a storage device or memory, for example storage database 202, a positioning system 205 that may be a GPS or similar system, an alerting device such as an alarm 217 or display 220, and a processor 211, all of which are typically located on the vehicle (e.g. on aircraft 101 of FIG. 1).

As an overview, positioning system 205 typically repeatedly determines the location of the vehicle. The processor 211 typically compares the location of the vehicle (e.g. aircraft 101 on FIG. 1) with stored location information for various zones of awareness (e.g. zone of awareness 121 on FIG. 1) and initiates an alert when appropriate. The processor 211 may take into consideration the velocity and direction of travel of the vehicle (e.g. of aircraft 101 on FIG. 1). Referring to FIG. 1, zones of awareness (e.g. 121) may be defined by coordinates, such as the end points of line segments (e.g. points 141 and 142 defining the endpoints of centerline 131 of runway 111). Audible alarms (e.g. 217 on FIG. 2) may include a voice warning, and may be able to be silenced until the vehicle (e.g. aircraft 101 on FIG. 1) leaves the zone of awareness (e.g. zone of awareness 121 on FIG. 1). On aircraft (e.g. aircraft 101 on FIG. 1), the system may reference a positional line of awareness such as the centerline of the runway, for example on FIG. 1, alerting when aircraft 101 is within 150 feet of centerline 131. The system may be disabled when the aircraft is in flight.

An alerting system according to the present invention may be a system installed on a vehicle, or may include the vehicle itself. In either case, the present invention may require additional hardware, or may be constructed, all or in part, using hardware already installed on the vehicle, e.g. for other purposes. In some embodiments, such as illustrated in FIG. 1, the vehicle is an aircraft (e.g. 101), and the occupants are the pilot or flight crew of the aircraft. However, the vehicle may be another type of vehicle such as a luggage vehicle, a fuel vehicle, a maintenance vehicle, a moveable stairway, an emergency vehicle, or any other vehicle found at an airport (e.g. airport 100). In addition, in other embodiments the vehicle may be found at another location, and may be an automobile, a surface ship or boat, a submarine, a train or locomotive, a spacecraft, a golf cart, a construction vehicle, a snow mobile, a man lift, or generally any other vehicle configured to carry at least one person.

Figure 2:
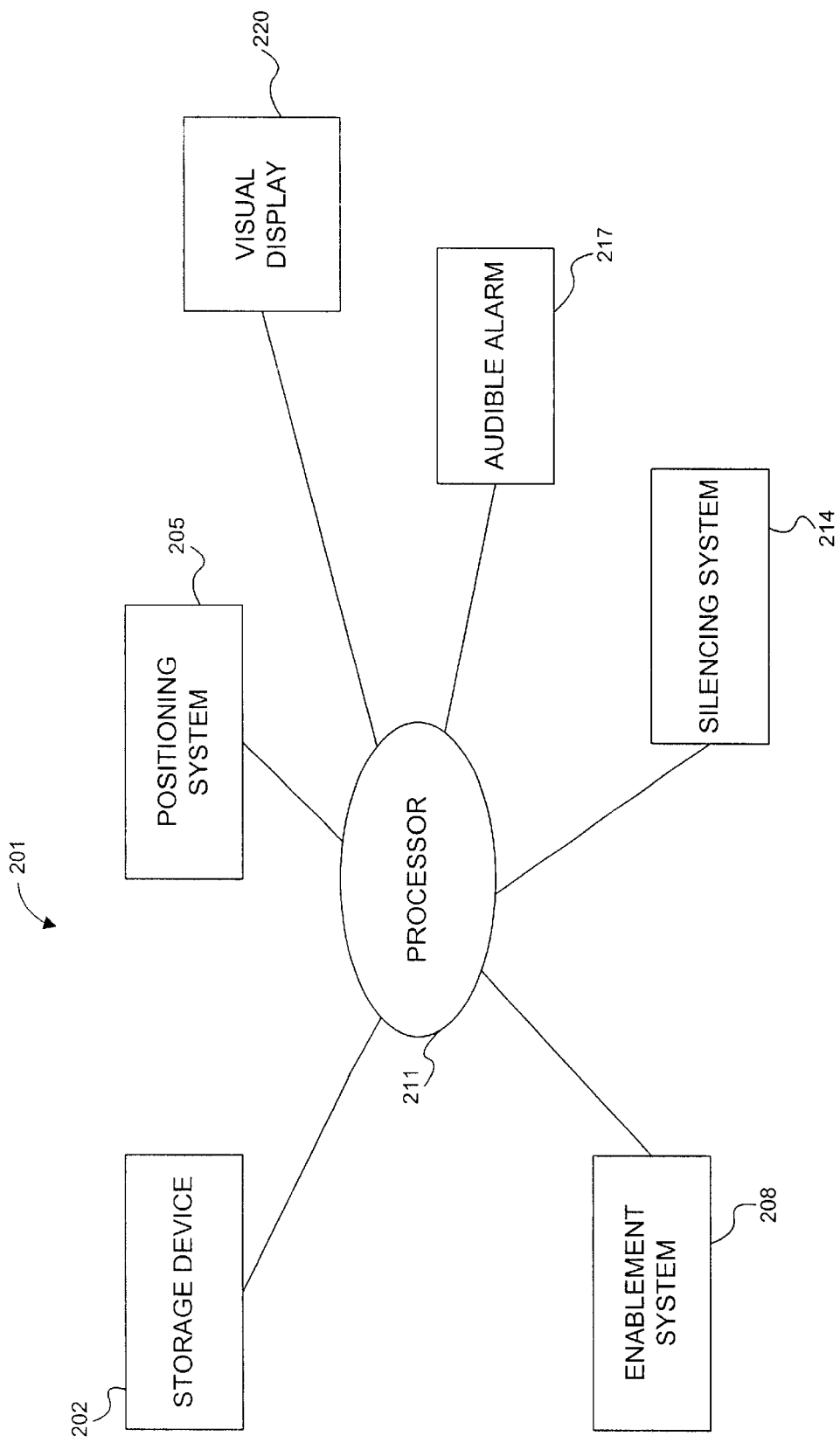
FIG. 2 is a block diagram illustrating conceptually assorted components of various embodiments of the present invention.
Figure 3:
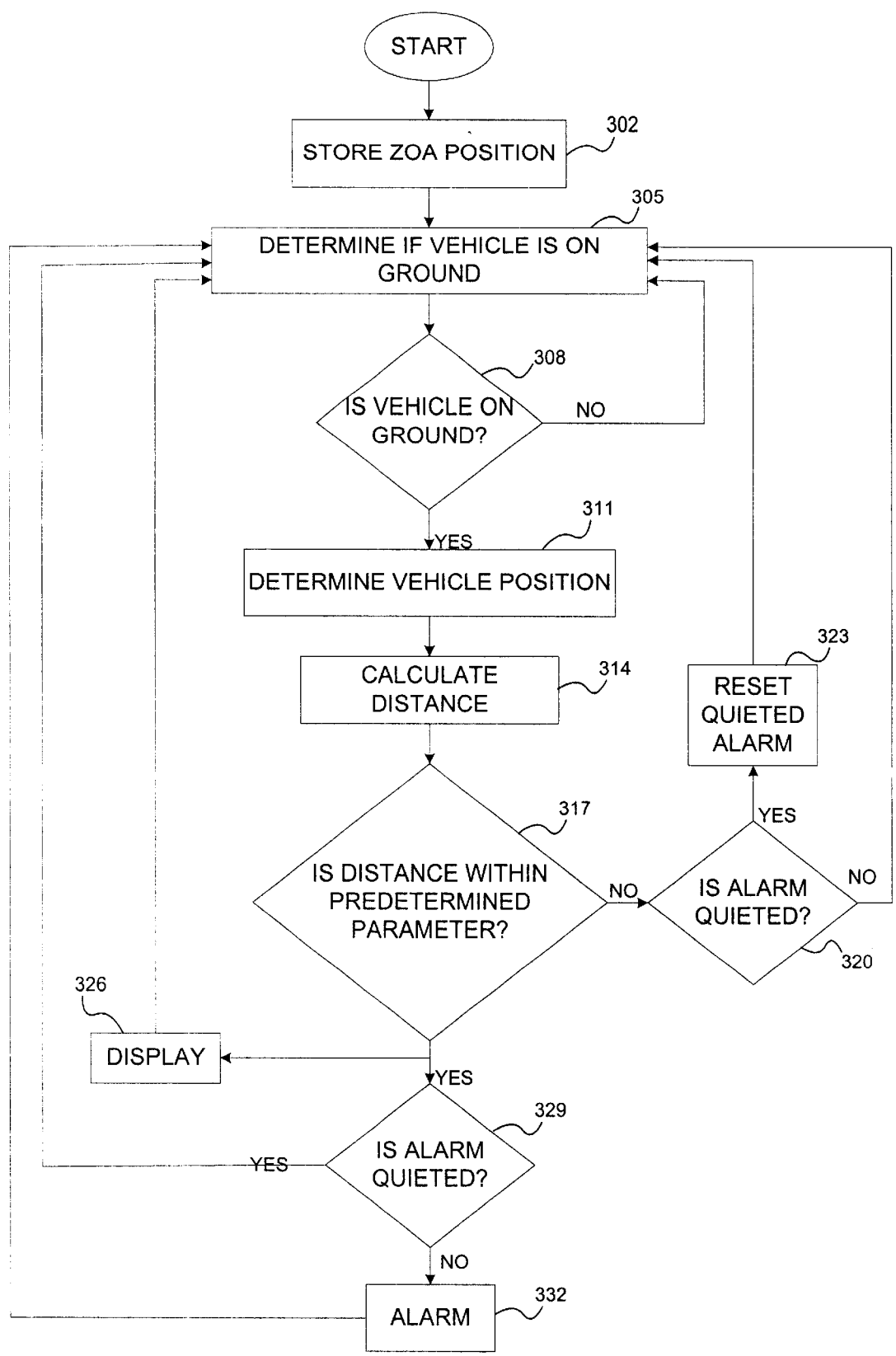
FIG. 3 is a flow chart illustrating steps of methods according to various embodiments of the present invention.

Referring to FIG. 2, an alerting system 201 according to the present invention is typically for alerting an occupant of a vehicle that the vehicle is in a zone of awareness, or approaching a zone of awareness. In many embodiments, the system alerts under both conditions. Alerting system 201 typically includes a storage device 202, a positioning system 205, an alerting device such as alarm 217 or display 220, and a processor 211. Although described herein as being separate systems or components, as would be understood by a person skilled in the art, conceptual components described herein of these and other systems may be combined in the same equipment or may be part of other systems or equipment otherwise unrelated to the present invention.

Storage device 202 is typically located on the vehicle and is configured to store a database containing location information for a plurality of zones of awareness. Storage device 202 may be, as an example, computer memory such as random access memory (RAM), read-only memory (ROM), such as a compact disk (CD) ROM, or erasable programmable read-only memory (EPROM). Storage device 202 may be used for other purposes besides the present invention, or may be dedicated to the present invention. In embodiments where the vehicle is an aircraft, storage device 202 may comprise or be part of the Flight Management System (FMS) Navigational Database.

A zone of awareness as used herein is generally an area or geographic region of particular interest or hazard. For instance, as illustrated in FIG. 1, zone of awareness 121 is the area of runway 111 where aircraft may be moving at a high rate of speed when they are landing or taking off. There may be many zones of awareness, e.g. one for each runway that the aircraft is authorized to use. For a commercial airliner, this may include all runways in the world that are at least 3000 feet long, typically just hard surfaced runways. There may be exceptions that the aircraft is not authorized to use, such as military airfields, or airfields in countries that are hostile to the country from which the aircraft originates. On the other hand, even these exceptions would be of interest to the pilots and flight crew of aircraft that use them, and may be included in the database.

The location information stored on storage device 202 may include the location of a reference from which the zone of awareness is defined. For instance, the reference may be a line or line segment, and the location information may be the coordinates of the endpoints of line segments. The coordinates may be relative to the surface of the earth, and may be longitude and latitude. Referring to FIG. 1, as an example, storage device 202 may contain location information for a plurality of runways, for example runways 111, 112, 113, at airport 100, and other runways at other airports not shown on the figures. The centerline of each runway, for example centerline 131 of runway 111, may be references or positional lines of awareness, which may be defined by the coordinates of the endpoints, for example points 141 and 142 of runway 111. Thus, storage device 202 may need only store the coordinates of endpoints 141 and 142 for centerline 131 of runway 111. Processor 211 on aircraft 101 would then initiate an alert if the distance between aircraft 101 and the line segment between points 141 and 142 (e.g. centerline 131) fell below the predetermined parameters, for example, below 150 feet. The database in storage device 202 containing the location information for various zones of awareness may need to be updated periodically as conditions change, e.g. as new runways and airports are opened and old runways and airports are closed either temporarily or permanently. For instance, the database in storage device 202 may be updated every 28 days.

As illustrated in FIG. 1, zones of awareness around runways may be rectangular, for example, typically over 3000 feet long and about 300 feet wide. Alternatively, a zone of awareness may encompass only part of a runway, for instance, the part where taxiways abut the runway. In such an embodiment, the zone of awareness may be considerably shorter. The ends may be square as shown, or may be half circles (i.e. all of the area within a fixed distance of either the end points (141 and 142) or the line segment in between. Zones of awareness may have other shapes, particularly in embodiments where the feature within is an area, such as a hazardous area, other than a runway. Other shape zones of awareness may have other shaped references such as points, polygons, curves, and the like. In many embodiments, zones of awareness are particular geographic areas on the surface of the earth. However, zones of awareness in accordance with the present invention may be defined relative to other references or coordinate systems provided the positioning system (e.g. 205, described in detail next) is capable of providing information relative to those references or coordinate systems, or that can be converted to such.

Positioning system 205 is typically also located on the vehicle, and is typically configured to determine the vehicle location. Positioning system 205 may be a global positioning system (GPS), for instance, which uses signals from satellites in orbit around the earth to determine the location of the vehicle. Where greater accuracy is desired than is offered by a typical GPS, positioning system 205 may also have an augmentation system. Either a wide area augmentation system (WAAS) or a local area augmentation system (LAAS) may be used. An augmentation system may, for example, include an additional reference point located near the zone of awareness, and would typically improve the accuracy of positioning system 205. The positioning system 205 could also be an internal reference system (IRS), a laser ring gyroscopic system, or other system e.g. that determines its position relative to the magnetic sphere of the earth. Positioning system 205 could use a composition position from several sources such as an FMS position, for example utilizing some combination of GPS, IRS and VOR/DME information. Greater precision resulting from more sophisticated positioning systems will typically result in fewer false alerts, fewer missed alerts, or both, making the alerting system 201 more effective and more reliable.

Processor 211 is also typically located on the vehicle, and is typically configured to provide controlling input to the alerting device (217 or 220) based on the vehicle location and the location information e.g. of the zones of awareness stored in storage device 202. In other words, processor 211 figures out when to alert, and tells the alerting device when to alert, and in some embodiments, what information to present. Thus, processor 211 initiates the alerting device. Processor 211 may be a computer or computer processor, typically capable of performing operations and manipulating data. Thus, as illustrated in FIG. 2, processor 211 receives information form storage device 202, positioning system 205, and in some embodiments other systems, some of which are described below, and from this information determines whether the vehicle is in or approaching a zone of awareness. If it is, and various prerequisite conditions are met, then processor 211 alerts or notifies the occupants of the vehicle, such as the driver or pilot, typically either via alarm 217, display 220, or both. In other words, processor 211 is configured to initiate, or provide controlling input to, the alerting device, based on the vehicle location and the location information in storage device 202. Processor 211 may have other responsibilities or be part of another system such as, for example, a navigation computer, a control system, or a flight management system (FMS) or EGPWS on an aircraft. Processor 211 may be programmed in a computer language such as C++, typically in ways familiar to a person skilled in the art of programming.

For example, processor 211 may be programmed or configured to calculate the distance between the vehicle location and the location information from storage device 202 and initiate the alerting device (e.g. 217 or 220) if the distance is within predetermined parameters. In other words, processor 211 may calculate the distance between the vehicle and the reference, and initiate an alert if appropriate. The predetermined parameters may be a fixed distance between the vehicle and the zone of awareness, or between the vehicle and a reference defining or within the zone of awareness. For instance, processor 211 may initiate an alert whenever the distance between the vehicle and a reference is less than or equal to a fixed value. This fixed value may be, for example, between 100 and 200 feet. Fixed values within such a range will typically work well for embodiments such as shown in FIG. 1 where the vehicle is aircraft 101 and the reference is the centerline 131 of runway 111. For example, the fixed value or distance below which an alert is initiated may be 150 feet.

In more complex embodiments, processor 211 may be configured to take into consideration the motion of the vehicle. Processor 211 may, for example, adjust the predetermined parameters according to the velocity or direction of travel (or both) of the vehicle. For instance, processor 211 may increase the fixed distance at which an alert is initiated if the vehicle is approaching the zone of awareness. The amount of increase, for instance, may be proportional, or otherwise related to, the speed at which the vehicle is approaching the zone of awareness. Alternatively, processor 211 may adjust the values it is using for the vehicle location, the location of the reference, or the distance between the vehicle location and the location of the reference, according to the velocity, direction of travel, or both, of the vehicle. Processor 211 may also be configured to take into consideration the shape of the vehicle, the size of the vehicle, where the positioning system is located on the vehicle, or some combination thereof.

The alerting device may be an audible alarm 217 or a visual display 220. The alerting device, such as alarm 217 or display 220 (or both) is also typically located on the vehicle, and is generally configured to alert the occupant, for example, that the vehicle is within, or close to, a zone of awareness. An aural or audible alarm 217, which would typically be located in the vehicle, may be a buzzer, chime, bell, horn, speaker, or other device capable of making a sound. In some embodiments, audible alarm 217 produces a synthesized voice warning. For instance, in the embodiment illustrated in FIG. 1, alarm 217 may produce a voice warning such as "RUNWAY", "RUNWAY", "RUNWAY"... which may be repeated continuously as long as the vehicle is within the zone of awareness. As controlled by processor 211, alarm 217 may also indicate where the zone of awareness is relative to the vehicle, for example, "RUNWAY AHEAD" or "RUNWAY ON THE RIGHT".

Alternatively, or in addition, a voice warning from alarm 217 may include the designation of the zone of awareness or of a feature within the zone of awareness. Where applicable, such as regarding an aircraft on a runway, the designation may include or indicate the direction that the vehicle is going. In embodiments involving aircraft or airports, the designation used is preferably similar or identical to the designation used in communications with the air traffic controllers. For instance, in the embodiment illustrated in FIG. 1, the feature may be runway 111, which may be designated as Runway 27, and alarm 217 (e.g. on aircraft 101) may produce a voice warning such as "ENTERING RUNWAY 27", "ENTERING RUNWAY 27", "ENTERING RUNWAY 27"... which may repeat continuously. In this example, "27" indicates the direction that an aircraft traveling on the runway is headed, i.e. 270 degrees from North (West). Thus, an aircraft traveling the opposite direction (East) on the same tarmac may be said to be on "RUNWAY 9". Thus, such an embodiment would alert the pilot or flight crew not only to which runway they are on, but also as to which direction they are headed. A further designation, such as a letter, may be added where there are more than one runway in the same direction.

It may be distracting or annoying to the occupant of the vehicle for audible alarm 217 to alert continuously as long as the vehicle is within the zone of awareness. Therefore, alerting system 201 may also have a silencing system 214 (shown on FIG. 2) configured to allow the occupant to acknowledge and quiet or silence audible alarm 217. Typically, the operator will quiet alarm 217 manually via a button such as a push-button yolk mounted switch or annunciator warning capsule push button, a pickle switch, or through a spoken order and a voice recognition system. As would be apparent to a person of ordinary skill in the art, silencing system 214 may interface with processor 211 as shown in FIG. 2, or may interface directly with alarm 217. In such a system, processor 211 may be configured to rearm audible alarm 217 when the vehicle is no longer in the zone of awareness. Thus, alarm 217 will activate if the vehicle leaves the zone of awareness and reenters it or enters another zone of awareness. Where zones of awareness overlap, such as runways 111 and 113 in FIG. 1, alarm 217 may be configured to alert if the vehicle enters a second zone of awareness, even if the occupants of the vehicle have already silenced alarm 217 when the vehicle entered a first zone of awareness. In alternative to completely silencing alarm 217, a system may be provided to quiet alarm 217, i.e. to a reduced volume that is not as distracting. Alternatively, audible alarm 217 may be made less distracting by providing the warning only once, only a limited number of times, repeatedly for only a limited time, or only every so often.

In addition to or instead of audible alarm 217, alerting system 201 according to various embodiments of the present invention, may have a visual indication, which may be displayed on a visual display 220. Visual display 220 may be a screen such as a CRT, an LCD, or may be one or more lights or LEDs. Visual display 220 may be a control display unit with both a screen and a keyboard. The operator may be able to select various displays and perform various functions, in some embodiments, including inputting flight plans. The visual indication of the present invention, for example on visual display 220, may include a designation of a feature located within the zone of awareness. This designation may be similar to that for audible alarm 217 described above. In the exemplary embodiment illustrated in FIG. 1, the designation may be the designation of a runway. For instance, in the embodiment illustrated in FIG. 1, alarm 217 may produce a visual indication such as "RUNWAY", which may remain on visual display 220 as long as the vehicle is within the zone of awareness. Alternatively, a visual indication may include the designation of the zone of awareness or of a feature within the zone of awareness. For instance, in the embodiment illustrated in FIG. 1, the feature may be runway 27, and display 220 may show the designation of the runway. For example, visual display 220 may show a warning such as "RUNWAY 27", which may remain on display 220 as long as the vehicle is within the zone of awareness. Visual display 220 may also show other information, such as with reference to the exemplary embodiment illustrated in FIG. 1, a map of airport 100 showing the location of various features. Such features may include, inter alia, the aircraft itself (e.g. 101), the control tower 151, the terminal 153, taxiways (e.g. 162), and the runways (e.g. 111, 112, and 113).

In the embodiment of the present invention wherein the vehicle is an aircraft and the only purpose of the alerting system is to alert the pilot or flight crew while the aircraft is taxiing on the ground, it may be desirable that the system not alert the pilot or flight crew when the aircraft flies over a zone of awareness. Such systems may have an enablement system 208 configured to enable the alerting system when the aircraft is on the ground. However, it generally is not necessary to have a new or additional sensor for such a system. Rather, such a system may be activated by the aircraft having weight on the wheels (WOW) (e.g. through the Enhanced Ground Proximity Warning System (EGPWS)), by the landing gear being down, or other events or activities that occur when the aircraft is on the ground but usually not when it is in the air. Positioning system 205 may also be used to determine whether aircraft (e.g. 101) is on the ground. Thus, the system will only alert when the aircraft is taxiing, and not while it is flying. On the other hand, in other embodiments it may be desirable to enable an alerting system while an aircraft is in the air, for instance, to notify if an aircraft is about to enter restricted airspace, e.g. over a military base or a hostile country. It may also be desirable to have zones of awareness and the pilot or flight crew alerted when an aircraft flies into mountainous regions, high traffic regions, regions having unusual weather patterns, or regions currently having severe weather warnings. With such embodiments, it may be desirable to have an enabling system 208 that is configured to enable only certain features when the aircraft is on the ground, other features being enabled while the aircraft is in flight.

Referring to the embodiment illustrated in FIG. 1, the alerting system according to the present invention may be used to alert the pilot or flight crew of aircraft 101 that aircraft 101 is or approaching runway 111. However, in the alternative, or in addition, the alerting system may identify the specific runway that the aircraft is on or is approaching. Thus, in some embodiments of the present invention the method of reducing unintentional incursions of aircraft onto runways may provide a method of reducing aircraft accidents and collisions caused by aircraft inadvertently using the wrong runway. For instance, alerting the pilot or flight crew of the designation of the runway that the aircraft is on may prevent an aircraft from using a runway while believing it to be another runway. Such an error could cause tragedy in a situation where the runway that is being used is closed for maintenance or is currently being used by another aircraft. Errors of this type may occur, particularly in poor visibility conditions, such as at night, in poor weather conditions, or both. Such an alert system may be used for aircraft taxiing on the ground, but may also be used for aircraft that are in the air, e.g. for aircraft that are about to land. Such a system may be configured to alert the pilot or flight crew when the aircraft is lined up with a runway and is within a predetermined distance from the runway. The elevation of the aircraft, e.g. relative to the elevation of the runway, and the rate of decent, inter alia, may also be considered, e.g. by processor 211.

Alerting system 201 shown in FIG. 2 is typically located on a vehicle, such as aircraft 101 shown in FIG. 1. Generally each vehicle would have its own alerting system 201. Thus, aircraft 102 would have it's own system independent of the system on aircraft 101. The location information for various zones of awareness in storage device 202 may be the same, e.g. originally from the same source, for different vehicles (e.g. aircraft 101 and 102). However, it may be different, for instance, if aircraft 101 and 102 sometimes land at different airports.

In embodiments on aircraft, such as aircraft 101 in FIG. 1, existing systems on the aircraft may provide most of the hardware required. For instance, the FMS may perform the processing, storage, and positioning, the EGPWS may provide the audible alarm, and the CDU may provide the visual display. In some embodiments, only wiring and software changes may be required. For instance, a distance algorithm may be required.

Referring to FIG. 1, in embodiments involving traffic at airports, the alerting system may include a feature or step to notify air traffic controllers, e.g. in the control tower 151, of alerts. For instance, alerts may be communicated to air traffic controllers via radio, such as by telemetry. Such alerts may be presented for air traffic controllers on a display or other device so the air traffic controllers are aware when zones of awareness, such as runway 111, are occupied by vehicles such as aircraft 101. Air traffic controllers may then use this information to make decisions regarding whether other aircraft can land or take off on the runway. In an exemplary embodiment, a system may interface with a CNS/ATM ground mode displayed on the "bright" display console in the ground controller's station in the tower 151. Alternatively, alerts may be broadcast by voice radio or telemetry to alert pilots and flight crew of other aircraft, e.g. of runway incursions. Thus a pilot landing on a particular runway may be able to avoid a runway collision by flying around again when she is alerted that another aircraft has just mistakenly taxied onto the same runway.

FIG. 3 illustrates a method according to the present invention. The method illustrated in FIG. 3 may be used to reduce unintentional incursions of vehicles into zones of awareness. Typically, such a vehicle has human occupants who are alerted e.g. as to potential or imminent incursions. Various embodiments of the method typically include steps 302, 311, 314, 317, and at least one of 326 and 332. Step 302 is to store position information regarding the zones of awareness (ZOA), e.g. in storage device 202 of FIG. 2. In some embodiments, step 302 may be performed relatively infrequently, only as often as necessary to reflect changes in the zones of awareness. In such cases, step 302 may be performed by downloading data into storage device 202, for instance, from a CD, or by reprogramming an EPROM. In these embodiments, step 302 may be performed periodically, as an example, every 28 days. However, in embodiments where the zones of awareness change frequently, step 302 may be performed more often, for instance by receiving an updated database, or changes to the existing database, periodically by telemetry or radio transmission. Step 311 is to determine the position of the vehicle, and is typically performed repeatedly while the system is in operation. Thus, in many embodiments, step 311 is performed many times for each performance of step 302.

Step 314 may be to calculate the distance between the vehicle and the zone of awareness, or between the vehicle and a reference associated with the zone of awareness, such as the line segment described above. Step 317 is to determine if the distance is within predetermined parameters, e.g. within 150 feet. However, the velocity or direction of travel, or both, may be taken into consideration. In other words, an alert may be initiated sooner if the vehicle is traveling toward the zone of awareness at a higher speed. Step 332 is to sound an audible alarm, e.g. to alert the occupants of the vehicle, as described above with reference to alarm 217 in FIG. 2. Step 326 is to display a visual indication, typically also to alert the occupants of the vehicle, as described above with reference to visual display 220 in FIG. 2. Either step 332, step 326, or both, may be included in the method.

In some embodiments the method may include the step 308 of determining whether the vehicle is on the ground. In some such embodiments, steps 311, 314, and 317 are not performed unless the vehicle is on the ground. In other embodiments (not shown) the method would be altered in other ways if the vehicle is not on the ground, some of which are described herein.

In embodiments which have an alarm step 332, there may also be a feature to allow the occupant to acknowledge and silence or quiet the alarm. See as an example, silencing system 214 described above with reference to FIG. 2. In embodiments where the vehicle is an aircraft, the pilot or flight crew may perform the step of getting clearance to enter or cross the zone of awareness prior to quieting the alarm. Typically, the operator will quiet the alarm through a manual act such as by pressing a button or giving a voice command. Some embodiments of the method include step 329 to determine if the alarm has been quieted. Thus, alarm step 332 may take place only if the alarm has not been quieted, as determined in step 329. Some embodiments may also have step 320 to determine if the alarm has been quieted when, as determined in step 317, the distance is not within the predetermined parameters. These embodiments may also have step 323 to reset the quieted alarm where it has been found in step 320 that the alarm has been quieted. In other words, the method may include the step of re-enabling a quieted alarm when or after the distance between the vehicle and the reference exceeds a predetermined value, e.g. 150 feet. Thus, alarm 332 will be operational if the vehicle enters or approaches another zone of awareness.

In some embodiments, the method is used to reduce unintentional incursions of vehicles onto runways. Thus, the zones of awareness typically surround runways, and the method may use the centerlines of the runways as references for establishing the zones of awareness. In an exemplary embodiment, the present invention provides a method of reducing unintentional incursions of taxiing aircraft (e.g. aircraft 101 on FIG. 1) onto runways (e.g. runway 111 on FIG. 1). The aircraft typically has a control system and a pilot or flight crew, and the method typically includes the step 302 of storing within the control system the position of a plurality of runways, step 311 of determining the position of the aircraft, step 314 of calculating the distance between the aircraft and at least one runway, and step 326 or 332 of alerting the pilot or flight crew if said distance is found in step 317 to be within predetermined parameters.

In some embodiments, step 317 may include the steps of repeatedly determining the velocity of the aircraft, repeatedly determining the heading of the aircraft, and adjusting the predetermined parameters or the position of the aircraft based on the velocity and heading of the aircraft. In some embodiments the method may include the step 308 of determining whether the aircraft is on the ground. In some such embodiments, steps 311, 314, and 317 are not performed unless the aircraft is on the ground. In other embodiments (not shown) the method would be altered in other ways if the aircraft is not on the ground, some of which are described herein.

Embodiments of the method according to the present invention that have audible alarm may also include the step of the pilot or flight crew manually acknowledging and quieting the alarm, for example, by pressing a button or giving a voice command. Such embodiments may include the step of 323 of resetting or re-enabling a quieted alarm e.g. when or after the distance between the aircraft and the runway exceeds a predetermined value. Such re-enabling of the alarm may be automatic—i.e. not require action on the part of the pilot or flight crew.

Embodiments of the method may also include a step of providing to the occupant the designation of the zone of awareness, or a feature within the zone of awareness, that the vehicle is on, near, or approaching. Thus, the alerting system may alert the occupants of precisely what the vehicle is approaching, so that the occupant can respond accordingly. For instance, embodiments involving aircraft and runways may include a step of providing to the pilot or flight crew the designation of the runway that the aircraft is on or approaching. The system may be configured to provide the designation of the runway when the aircraft is approaching while taxiing on the ground, when it is approaching in the air (e.g. to land on the runway), or both. This step may be performed audibly though step 332, or visually through step 326. When the occupant receives an alert that the vehicle is in or approaching a zone of awareness, the occupant may reevaluate the course of the vehicle. Specifically, the occupant may choose to avoid the zone of awareness, or may take other action or precautions. Typically when a pilot or flight crew receives an alert that the aircraft (e.g. aircraft 101 in FIG. 1) is on or approaching a runway that they did not intend to use, the pilot or flight crew will take appropriate action, including as an example, the step of contacting an air traffic controller for instructions. For instance, a pilot may contact the local controller or ground controller by radio.

In the foregoing specification, the invention has been described with reference to specific exemplary embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. In addition, benefits, other advantages, and solutions to problems have been described above with regard to specific embodiments. However, the benefits, advantages, solutions to problems, and any elements(s) what may cause any benefit, advantage, or solution to occur or become more pronounced are not to be construed as a critical, required, or essential feature or element of any or all the claims. As used herein, the terms "comprises", "comprising", or any other variation thereof are intended to cover non-exclusive inclusion, such that a process, method, article, or apparatus that comprises a list of elements does not include only those elements but may include other elements no expressly listed or inherent to such process, method, article, or apparatus.

What is claimed is:

1. An alerting system for alerting an occupant of an aircraft on the ground that the aircraft is in or approaching a zone of awareness, the alerting system comprising:

a storage device located on the aircraft, said storage device being configured to store location information for a plurality of zones of awareness;

a positioning system located on the aircraft, said positioning system being configured to determine the aircraft location;

an alerting device located on the aircraft, said alerting device being configured to alert the occupant; and a processor located on the aircraft, said processor being configured to calculate, the distance between said vehicle location and said location information and initiate the alerting device if said distance is between 100 and 200 feet when the aircraft is on the ground.

2. The alerting system according to claim 1, the processor being configured to take into consideration the velocity, direction of travel, or both of the aircraft when determining whether or not to initiate the alerting device.

3. The alerting system according to claim 1, the distance being approximately 150 feet.

4. The alerting system according to claim 1, said location information comprising the coordinates of the endpoints of line segments.

5. The alerting system according to claim 4, said coordinates being longitude and latitude.

6. The alerting system according to claim 1, said positioning system being a GPS.

7. The alerting system according to claim 6, said positioning system further comprising an augmentation system.

8. The alerting system according to claim 1, said alerting system comprising an audible alarm located in the aircraft.

9. The alerting system according to claim 8, the audible alarm comprising a voice warning.

10. The alerting system according to claim 8, further comprising a silencing system configured to allow the occupant to acknowledge and silence said audible alarm.

11. The alerting system according to claim 10, said processor being configured to rearm said audible alarm when the aircraft is no longer in the zone of awareness.

12. The alerting system according to claim 1, said alerting system comprising a visual indication.

13. The alerting system according to claim 12, said visual indication comprising a designation of a feature located within the zone of awareness.

14. The alerting system according to claim 13, the feature being a runway.

15. The alerting system according to claim 1, said alerting system being configured to alert an occupant of a vehicle that the aircraft is within a zone of awareness.

16. The alerting system according to claim 1, said alerting system being configured to alert an occupant of an aircraft that the aircraft is approaching a zone of awareness.

17. The alerting system according to claim 1, said alerting system being configured to alert an occupant of an aircraft that the aircraft is within a zone of awareness, and said alerting system being configured to alert an occupant of an aircraft that the aircraft is approaching a zone of awareness.

18. The alerting system according to claim 1 the zone of awareness comprising a hazard of a collision with an object, the object being configured to move at a high rate of speed.

19. An alerting system for alerting a pilot or flight crew of an aircraft that the aircraft is in or approaching a zone of awareness, the alerting system comprising:
   a storage device located on the aircraft, said storage device being configured to store location information for a plurality of zones of awareness, at least a plurality of zones of awareness each substantially comprising a runway;
   a positioning system located on the aircraft, said positioning system being configured to determine the aircraft location;
   an alerting device located on the aircraft, said alerting device being configured to alert the pilot or flight crew; and
   a processor located on the aircraft, said processor being configured to calculate the distance between said aircraft location and said location information and initiate the alerting device if said distance is between 100 and 200 feet.

20. The alerting system according to claim 19, said system being configured to alert said pilot or flight crew when said aircraft is on a runway.

21. The alerting system according to claim 20, said alert comprising a designation of said runway.

22. The alerting system according to claim 21, the processor being configured to adjust the aircraft location, the location of the reference, or the distance between the aircraft location and the location of the reference, according to the velocity or direction of travel of the aircraft.

23. The alerting system according to claim 19, the distance being approximately 150 feet.

24. The alerting system according to claim 21, the plurality of zones of awareness comprising substantially all runways at least 3000 feet long that the aircraft is authorized to use.

25. The alerting system according to claim 21, said location information comprising the centerlines of runways.

26. The alerting system according to claim 21 the alerting device comprising an audible alarm.

27. The alerting system according to claim 21, the audible alarm comprising a voice warning.

28. The alerting system according to claim 19 further comprising an enablement system configured to enable at least some features of said alerting system when the aircraft is on the ground.

29. An alerting system for alerting a pilot or flight crew of an aircraft that the aircraft is in or approaching a zone of awareness, the alerting system comprising:
   a storage device located on the aircraft, said storage device being configured to store location information for a plurality of zones of awareness, at least a plurality of the zones of awareness each substantially comprising a runway, said location information comprising the coordinates of the endpoints of line segments;
   a positioning system located on the aircraft, said positioning system being configured to determine the aircraft location;
   an alerting device located on the aircraft, said alerting device being configured to alert the pilot or flight crew when said aircraft is approaching said runway, when said aircraft is on said runway, and the designation of said runway; and
   a processor located on the aircraft, said processor being configured to provide controlling input to the alerting device based on said aircraft location and said location information.

30. An alerting system for alerting a pilot or flight crew of an aircraft that the aircraft is in or approaching a zone of awareness, the alerting system comprising;
   a storage device located on the aircraft, said storage device being configured to store location information for a plurality of zones of awareness, at least a plurality of the zones of awareness each substantially comprising a runway, said location information comprising the coordinates of the ends of runways;
   a positioning system located on the aircraft, said positioning system being configured to determine the aircraft location;
   an alerting device located on the aircraft, said alerting device being configured to alert the pilot or flight crew when said aircraft is approaching a runway, when said aircraft is on a runway, and the designation of said runway; and
   a processor located on the aircraft, said processor being configured to provide controlling input to the alerting device based on said aircraft location and said location information.

31. An alerting system for alerting a pilot or flight crew of an aircraft if the aircraft is in or approaching a zone of awareness, the alerting system comprising:

a storage device located on the aircraft, said storage device being configured to store location information for a plurality of zones of awareness, at least a plurality of the zones of awareness each substantially comprising a runway, the location information being updated a first time, the location being updated a second time, the second time being no more than 28 days after the first time, the location being updated at least a third time, the third time being no more than 28 days after the second time;

a positioning system located on the aircraft, said positioning system being configured to determine the aircraft location;

an alerting device located on the aircraft, said alerting device being configured to alert the pilot or flight crew; and a processor located on the aircraft, said processor being configured to provide control input to the alerting device based on said aircraft location and said location information.

32. A method of reducing unintentional incursions of vehicles into zones of awareness, the aircraft having human occupants, said method comprising the steps of:

storing within the aircraft the position of a plurality of references, each reference corresponding to a zone of awareness;

at least a plurality of the zones of awareness comprising a hazard of a collision with a moving object;

repeatedly determining the position of the aircraft;

calculating the distance between the aircraft and at least one reference; and alerting the occupant if said distance is within 100 and 200 feet.

33. The method according to claim 32, the alerting comprising an audible alarm, the method further comprising the step of the occupant manually acknowledging and quieting the alarm.

34. The method according to claim 33 further comprising the step of re-enabling a quieted alarm when or after the distance between the aircraft and the reference exceeds a predetermined value.

35. The method according to claim 32 further comprising the step of providing to the occupant the designation of the zone of awareness, or of a feature within the zone of awareness, that the aircraft is in or near.

36. The method according to claim 32 further comprising after alerting, the step of the occupant reevaluating the course of the aircraft.

37. The method according to claim 32 used to reduce unintentional incursions of aircraft onto runways, the zones of awareness comprising runways.

38. The method according to claim 37 the references essentially comprising the centerlines of runways.

39. The method according to claim 37 the occupants being the pilots or flight crew of the aircraft.

40. The method according to claim 39 further comprising the step of determining whether the aircraft is on the ground.

41. The method according to claim 39 the alerting comprising an audible alarm, the method further comprising the step of the pilot or flight crew manually acknowledging and quieting the alarm.

42. The method according to claim 32 further comprising the step of providing to the pilot or flight crew the designation of the runway that the aircraft is on or approaching.

43. The method according to claim 32 further comprising after alerting, the step of the pilot or flight crew contacting an air traffic controller for instructions.

44. The method according to claim 32 wherein at least one zone of awareness comprises an area that is closed for maintenance.

* * * * *